US010776025B2

(12) United States Patent
Brown et al.

(10) Patent No.: US 10,776,025 B2
(45) Date of Patent: Sep. 15, 2020

(54) PORTABLE STORAGE DEVICE THAT IS SELF-CONVERTIBLE FROM BEING A REMOVABLE DISK TO A FIXED DISK AND FROM BEING A FIXED DISK TO A REMOVABLE DISK

(71) Applicant: Apricorn, Poway, CA (US)

(72) Inventors: Paul Cameron Brown, San Diego, CA (US); Mark Gordon Dobson, San Diego, CA (US); Phuoc Minh Thai, Poway, CA (US)

(73) Assignee: APRICON, Poway, CA (US)

( * ) Notice: Subject to any disclaimer, the term of this patent is extended or adjusted under 35 U.S.C. 154(b) by 0 days.

(21) Appl. No.: 16/430,335

(22) Filed: Jun. 3, 2019

(65) Prior Publication Data

US 2019/0303029 A1 Oct. 3, 2019

Related U.S. Application Data

(63) Continuation of application No. 15/940,922, filed on Mar. 29, 2018, now Pat. No. 10,338,840.

(51) Int. Cl.
*G06F 3/06* (2006.01)
*G06F 1/16* (2006.01)

(52) U.S. Cl.
CPC .......... *G06F 3/0634* (2013.01); *G06F 1/1679* (2013.01); *G06F 3/0604* (2013.01); *G06F 3/0673* (2013.01)

(58) Field of Classification Search
None
See application file for complete search history.

(56) References Cited

U.S. PATENT DOCUMENTS

| 6,016,402 | A  | * | 1/2000 | Thomas | G06F 3/0601 |
|           |    |   |        |        | 361/679.37  |
| 7,237,046 | B2 | * | 6/2007 | Paley  | G06F 3/0622 |
|           |    |   |        |        | 710/11      |
| 7,739,732 | B2 |   | 6/2010 | Camilli |           |

(Continued)

FOREIGN PATENT DOCUMENTS

EP        2453346        5/2012

OTHER PUBLICATIONS

Extended European Search Report from European Patent Application No. 19165869.9, dated Aug. 14, 2019, 10 pages.

*Primary Examiner* — Elias Mamo
(74) *Attorney, Agent, or Firm* — Morgan, Lewis & Bockius LLP

(57) ABSTRACT

A portable storage device can convert itself, without a host computer, from being a fixed disk to a removable disk and from being a removable disk to a fixed disk. The storage device may include a physical input device, a memory and a controller. The controller may determine, based on information stored within the storage device, whether the storage device is currently a fixed disk or a removable disk. The controller may then convert the storage device to a removable disk or a fixed disk, based on a control input and the determination. The control input may be received from the physical key input device. When the storage device is a removable disk and when a command from a host computer requests ejecting a memory within the storage device, the controller declines the request and instead electrically disengages the storage device from the host computer.

20 Claims, 11 Drawing Sheets

(56) References Cited

U.S. PATENT DOCUMENTS

| | | | |
|---|---|---|---|
| 8,069,281 B2 | 11/2011 | Ikemoto | |
| 8,351,821 B2 | 1/2013 | Asahara | |
| 8,484,736 B2 | 7/2013 | Hahn et al. | |
| 8,572,362 B2 | 10/2013 | Castillo | |
| 9,009,816 B2 | 4/2015 | Hamid | |
| 9,081,946 B2 * | 7/2015 | Fruhauf | G06F 21/80 |
| 9,354,898 B1 | 5/2016 | Luttmann et al. | |
| 9,424,017 B2 | 8/2016 | Macken et al. | |
| 9,720,700 B1 | 8/2017 | Brown | |
| 2002/0073340 A1 * | 6/2002 | Mambakkam | G06F 21/32 |
| | | | 726/2 |
| 2005/0066129 A1 | 3/2005 | Chang et al. | |
| 2007/0023499 A1 | 2/2007 | Wurzburg | |
| 2008/0005415 A1 | 1/2008 | Lopez et al. | |
| 2008/0209262 A1 * | 8/2008 | Maity | G06F 9/4416 |
| | | | 714/6.11 |
| 2008/0250172 A1 | 10/2008 | Tanaka | |
| 2009/0217304 A1 | 8/2009 | Shih et al. | |
| 2009/0240881 A1 * | 9/2009 | Halloush | G06F 1/3203 |
| | | | 711/114 |
| 2013/0097340 A1 | 4/2013 | Chen | |
| 2013/0167226 A1 * | 6/2013 | Lin | H04M 1/0256 |
| | | | 726/19 |
| 2014/0297953 A1 * | 10/2014 | Beck | G06F 3/0629 |
| | | | 711/115 |

\* cited by examiner

400A

Secure Key 3z:

Product ID: 0x1408
Vendor ID: 0x0984 (Apricorn)
Version: 4.01
Serial Number: 109800002567
Speed: Up to 5 Gb/sec
Manufacturer: Apricorn
Location ID: 0x14440000 / 8
Current Available (mA): 900
Current Required (mA): 896
Extra Operating Current (mA): 0
Media:

Secure Key 3z:

Capacity: 16.01 GB (16,013,942,272 bytes)
Removable Media: No
BSD Name: disk3
Logical Unit: 0
Partition Map Type: GPT (GUID Partition Table)
USB Interface: 0
Volumes:

400B

Secure Key 3z:

Product ID: 0x1409
Vendor ID: 0x0984 (Apricorn)
Version: 9.10
Serial Number: 000000000094
Speed: Up to 5 Gb/sec
Manufacturer: Apricorn
Location ID: 0x14300000 / 7
Current Available (mA): 900
Current Required (mA): 896
Extra Operating Current (mA): 0
Media:

Secure Key 3z:

Capacity: 16.01 GB (16,013,942,272 bytes)
Removable Media: Yes
BSD Name: disk2
Logical Unit: 0
Partition Map Type: Unknown
USB Interface: 0

FIG. 4A

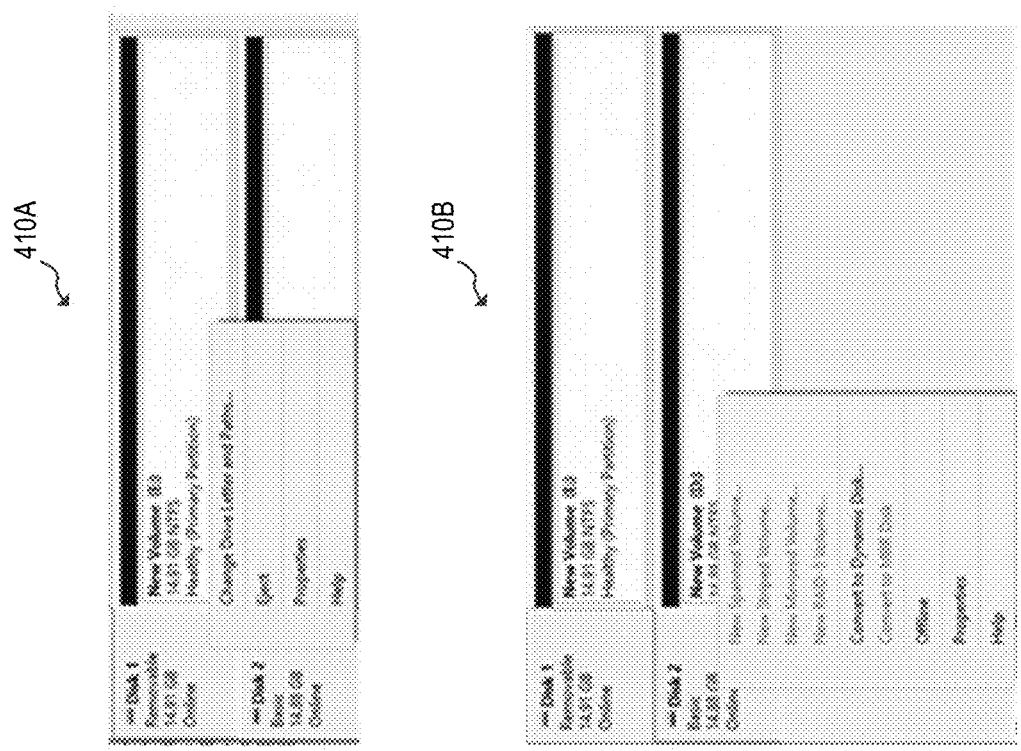

PORTABLE STORAGE DEVICE THAT IS SELF-CONVERTIBLE FROM BEING A REMOVABLE DISK TO A FIXED DISK AND FROM BEING A FIXED DISK TO A REMOVABLE DISK

CROSS REFERENCE TO RELATED APPLICATIONS

This application is a continuation application of U.S. application Ser. No. 15/940,922, filed on Mar. 29, 2018, now U.S. Pat. No. 10,338,840, the entirety of which is incorporated herein by reference.

TECHNICAL FIELD

The present description relates in general to computer-based storage devices, and more particularly to, for example, without limitation, storage devices that are self-convertible from being a removable disk to a fixed disk and from being a fixed disk to a removable disk.

BACKGROUND

Manufacturers provide portable storage devices as either a removable disk or a fixed disk. Operating systems treat portable storage devices in different ways depending on whether the portable storage device identifies as a removable disk or a fixed disk. This different treatment may not align with certain applications or use case scenarios. Further, embedded systems may be configured to interoperate only with a removable disk or a fixed disk, precluding many portable storage devices from being used at all with embedded systems. This incompatibility may be especially problematic for secure portable media devices or other portable media devices that are customized for specialized applications and industries.

The description provided in the background section should not be assumed to be prior art merely because it is mentioned in or associated with the background section. The background section may include information that describes one or more aspects of the subject technology.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIGS. 4A through 4F illustrate examples of graphical user interfaces at a host interacting with a storage device that is self-convertible between being a removable disk and a fixed disk.

Figure 1:
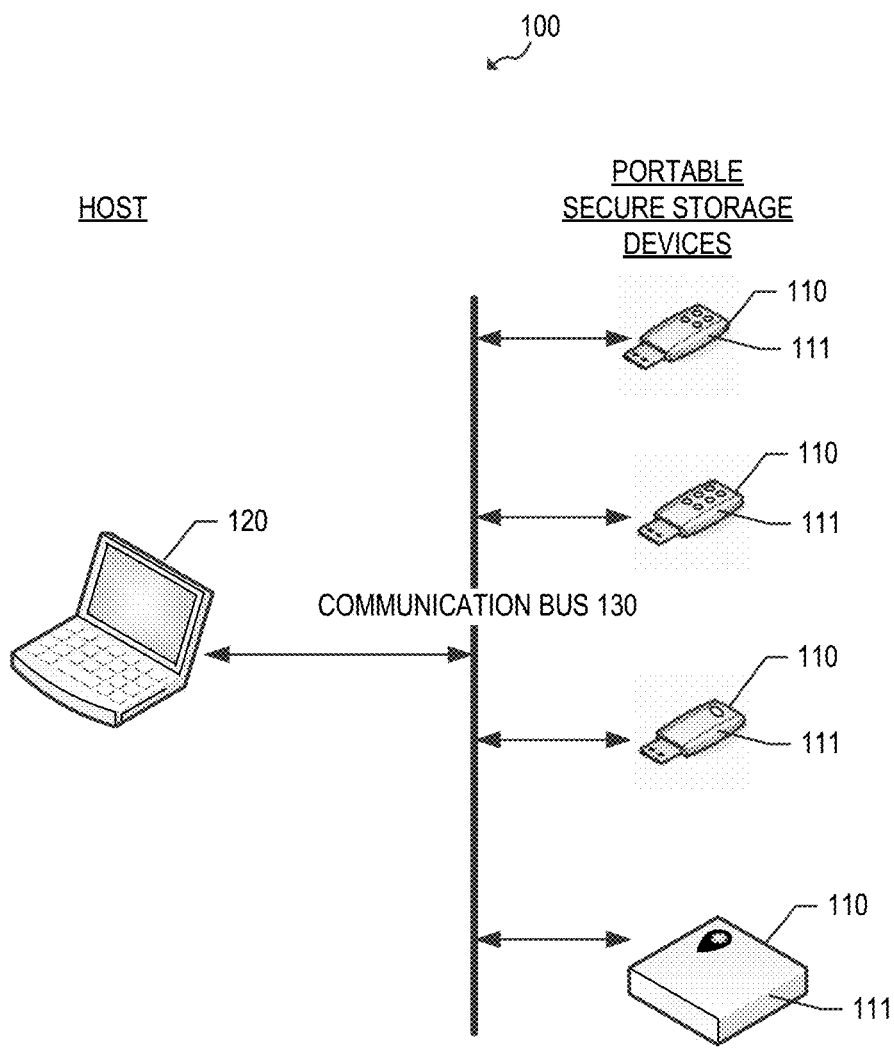
FIG. 1 illustrates an example of architecture for a host and storage devices.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

In one or more implementations, a portable secure storage device does not require a software application or modified driver (e.g., on a host) to convert the portable secure storage device from being a removable disk to a fixed disk and from being a fixed disk to a removable disk. Instead, the portable secure storage device is self-convertible between being a removable disk and a fixed disk. In one or more aspects, the phrase "between being a removable disk and a fixed disk" or "between a removable disk and a fixed disk" can be understood as from being a removable disk to a fixed disk and/or from being a fixed disk to a removable disk. Further, the term "removable disk" may be sometimes described as "removable medium," "removable drive," or a similar term. The term "fixed disk" may be sometimes described as "fixed medium," "fixed drive," or a similar term.

A portable secure storage device may include a physical input device, such as a keypad, to receive a user's request to convert the portable secure storage device between a removable disk and a fixed disk. Further, when the portable secure storage device is a removable disk, the portable secure storage device may electrical disengage itself from a host in response to an eject request from the host (i.e., a request to eject the medium within the removable disk), thereby providing a clean electrical removal of the entire portable secure storage device, including the medium or media within the portable secure storage device.

The disclosed system addresses challenges arising in the realm of computer technology by providing a solution rooted in hardware, namely, by providing a portable secure storage device that is self-convertible from being a fixed disk to a removable disk and from being a removable disk to a fixed disk. By enabling the portable secure storage device to self-convert in such a manner, a host may continue to use standard peripheral interface drivers to communicate with the portable secure storage device while the portable secure storage device can flexibly convert itself according to application or use case requirements. Accordingly, on the host side, extra software such as helper applications, modified drivers, filter drivers, or other workarounds to provide a convertible disk are unnecessary, thereby improving the performance of the host computer by eliminating installation and execution overhead of such extra software.

For example, an operating system of the host computer may treat a fixed disk differently from a removable disk for file system support, partition type support, multiple partition support, boot support, and access to advanced features such as dynamic disks or creating a redundant array of independent disks (RAID). By using a portable secure storage device that is self-convertible between a fixed disk and a removable disk, storage attributes required by the host operating system may be enabled by the portable secure storage device. Further, in one or more aspects, as the portable secure storage device can self-convert without a host or any applications on a host, the conversion process can be simpler and more secure. In addition, since the user can freely convert the portable secure storage device between the fixed disk and the removable disk without using specialized tools or returning the product for service or exchange, the device manufacturer can simplify their product line (e.g., eliminating the need to provide two separate types of storage devices—one for a fixed disk type and another for a removable disk type) and reduce support costs.

The portable secure storage device can also self-convert for compatibility with embedded systems, which may be hardcoded to operate with only a fixed disk or a removable disk. Embedded systems may also provide restricted functionality and/or higher security compared to general-purpose operating systems, and thus host-side software may be unavailable for installation and use with embedded systems. Thus, a portable secure storage device that is self-convertible between the removable disk and the fixed disk can provide greater interoperability for a wide variety of host systems, including embedded systems.

Further, when the portable secure storage device is a removable disk, the portable secure storage device can provide an electrical disengagement of the portable secure storage device in response to an eject request from the host. In this manner, a clean removal of the entire portable secure storage device, including any medium within it, can occur, rather than simply ejecting the medium only. Since the portable secure storage device does not remain on the interface bus with the host, the host can avoid polling and keep-alive messages on the interface bus after an eject request is issued for the portable secure storage device, which improves host computer performance. Further, the clean removal of the portable secure storage device allows a corresponding connection port to quickly recognize the removal and enter into a low power state, which reduces host computer power consumption.

Various aspects of the subject technology relate to systems, methods, and machine-readable media for providing a portable secure storage device that is self-convertible between a removable disk and a fixed disk. In one or more implementations, a portable secure storage device includes a secure memory, a controller, and a physical input device. The controller may determine, based on information stored within the storage device, whether the portable secure storage device is a fixed disk or a removable disk. The controller may convert the portable secure storage device to a removable disk or a fixed disk, based on the determination and a request for conversion.

FIG. 1 illustrates an example of architecture for a host and a portable secure storage device that is self-convertible between a removable disk and a fixed disk. The architecture 100 includes a host 120 and portable secure storage devices 110 connected over a communication bus 130.

The host 120 is operable to connect to the portable secure storage devices 110. In some aspects of the present technology, the host 120 may be a computer with a general purpose operating system. In other aspects of the present technology, the host 120 may be an embedded system. Multiple portable secure storage devices 110 can be connected to the host 120 over a common data terminal (e.g., the communication bus 130).

The host 120 may include one or more computing devices. The host 120 can be, for example, a desktop computer, a personal computer (PC), a server, a mobile computer, a tablet computer (e.g., an e-book reader), a mobile device (e.g., a smartphone or personal digital assistant (PDA)), or any other type of devices or systems having appropriate processor, memory, and communications capabilities for connecting to the portable secure storage device(s) 110.

The host 120 can also be an embedded system that includes a custom firmware, a field-programmable gate array (FPGA), an application-specific integrated circuit (ASIC), or other circuitry. For example, host 120 can be a secure radio, a medical device, an audio/visual recording and playback unit, or another device. These embedded systems may permit a connection to portable secure storage devices 110 for reading and writing images, sounds, videos, and other data.

The portable secure storage device 110 can be a storage device having appropriate processor, memory, and communications capabilities for storing secure data, serving as a secure data back-up, and/or transferring secure data. The secure data may be accessible by various computing devices including the host 120 over the communication bus 130. A device 110 may be sometimes referred to as a drive or a memory apparatus. For example, a portable secure storage device 110 may correspond to a portable hard disk drive, a portable solid state drive, a flash memory key, or another portable storage device.

The communication bus 130 can include or can be a part of, for example, any one or more of a universal serial bus (USB), IEEE 1394, Ethernet, serial ATA, and/or any other type of communication bus, communication interface or communication port. A communication bus may be referred to as a communication channel, a communication medium, or vice versa. Further, the communication bus 130 can include, but is not limited to, any one or more of the following network topologies, including a bus network, a star network, a ring network, a mesh network, a star-bus network, tree or hierarchical network, or any other suitable type of network.

Figure 2:
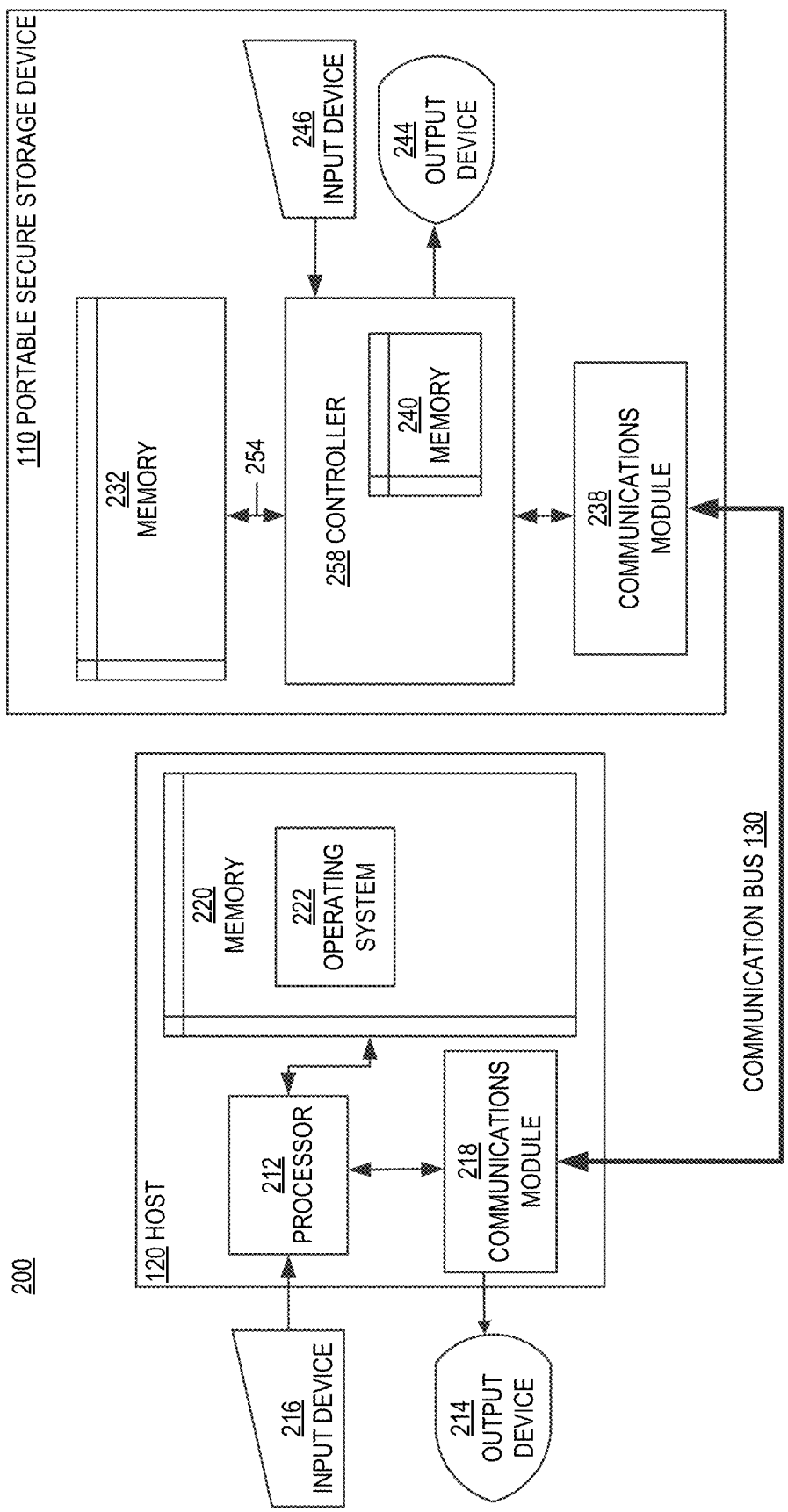
FIG. 2 is a block diagram illustrating an example of (a) a host and (b) a storage device that is self-convertible from being a removable disk to a fixed disk and from being a fixed disk to a removable disk.

FIG. 2 is a block diagram illustrating an example of a portable secure storage device 110 and the host 120. The host 120 and the portable secure storage device 110 are connected over the communication bus 130 via respective communications modules 218 and 238.

The communications modules 218 and 238 are configured to interface with the communication bus 130 to send and receive information, such as data, requests, responses, and commands between the host 120 and the portable secure storage device 110. The communications modules 218 and 238 can be, or can be a part of, for example, serial bus connectors or interfaces. The communications modules 218 and 238 may be referred to as, or may include, network interfaces or communication interfaces. In one or more examples, the communications module 218 and the communication bus 130 may be a part of a USB. In one example, the communications module 238 may be a part of a USB connector, and the communications module 218 and the communication bus 130 may be a part of a USB port(s), and the USB connector may be connected to the USB port. In one example, each of the communications modules 218 and 238 and the communication bus 130 is a wired communications module or bus. In another example, each of the communications modules 218 and 238 and the communication bus 130 may be a wireless communications module or bus. In one or more implementations, the communications modules 218 and 238 and the communication bus 130 may include, or be part of, a wireless interface(s), a wireless port(s), a wireless medium/media, and/or a wireless channel(s) to allow wireless communications between a host and a portable secure storage device(s)).

The host 120 includes a processor 212 and a memory 220. The memory 220 may be a read-and-write memory, a read-only memory, a volatile memory, a non-volatile memory, or a combination of some or all of the foregoing. The memory 220 of the host 120 includes an operating system 222, which may be a general-purpose operating system or an embedded operating system. The memory 220 may also include one or more applications (not shown) to communicate with the portable secure storage device 110. From the memory 220, the processor 212 may retrieve instructions to execute and data to process in order to execute the processes of the subject disclosure. The processor 212 can be a single processor, multiple processors, or a multi-core processor in different implementations.

The portable secure storage device 110 includes a memory 232 and a controller 258. The portable secure storage device 110 may further include a communications module 238, an input device 246, and an output device 244. The input device may be referred to as a physical input device, a physical key input device, or a key input device. The output device may be referred to as a physical output device.

In one or more implementations, the portable secure storage device 110 includes a casing (e.g., 111 as illustrated in FIG. 1). The casing may be, for example, a metal-based casing (e.g., aluminum) or a hardened plastic material. The casing may be made of multiple parts. In one or more implementations, the memory 232 and the controller 258 are disposed within the casing.

The memory 232 is configured to store secure data (e.g., encrypted data). The memory 232 may be, or may include, a read-and-write memory, a read-only memory, a volatile memory, a non-volatile memory, registers, or a combination of some or all of the foregoing. In some aspects, the memory 232 is a non-volatile memory unit that stores data even when the portable secure storage device 110 is powered off. The memory 232 may include one or more memories. The memory 232 may include a flash memory, a hard drive, a solid-state drive, or some combination thereof. In one or more implementations, the memory 232 is a mass storage device.

The memory 232 may be communicably coupled to the controller 258 via a bidirectional communication link 254. In one or more implementations, the link 254 is a high-speed serial advanced technology attachment (SATA) for point-to-point connection between the memory 232 and the controller 258.

The physical input device 246 enables a user to communicate information and select commands to the portable secure storage device 110. For example, the physical input device 246 may receive a security identification code (e.g., one or more of an administrator PIN, a user PIN, a recovery PIN, a self-destruct PIN and/or a combination thereof) from a user to facilitate unlocking of the portable secure storage device. The security identification code may also facilitate authentication of the user. The physical input device 246 may receive other control input to control the operation of the portable secure storage device. For instance, the physical input device 246 may receive a control input from a user to convert a portable secure storage device 110 between a removable disk and a fixed disk. In one example, when a user presses a first sequence of buttons (e.g., an administrator PIN) to enter an administrative mode, the user can press a second sequence of buttons to request conversion of the portable secure storage device 110 between a removable disk and a fixed disk.

The physical input device 246 may include any acoustic, speech, visual, touch, tactile and/or sensory input device, such as a keypad, a switch, a jumper, a pointing device, a dial, a sensor device (e.g., a biometric sensor, a finger sensor, biometric iris recognition sensor), or a touchscreen. In one or more implementations, the physical input device 246 is disposed on or at an outer surface of the casing so that a user can access the physical input device. Having a physical input device on the portable secure storage device itself allows a user to securely access the device or prevent access to the device and to convert the portable secure storage device 110 between a fixed disk and a portable disk without using an external system, such as a host computer or host software. The physical input device 246 is configured to receive an input provided by a user. In one or more implementations, the input includes one or more keypad entries, a switch setting, a jumper setting, a biometric-based entry, a touch gesture entry, or a combination thereof. To prevent accidental inputs, one or more components of physical input device 246 may be recessed or hidden under a cover.

The physical output device 244 may be disposed on or at the outer surface of the casing and configured to display an indication of the operation of the portable secure storage device 110. Such indication may be controlled by the controller 258. The output device 244 may enable, for example, the display or output of visual signaling by the controller 258. The indication may include a signal indicating, for example, whether the portable secure storage device 110 is a fixed disk or a removable disk, or whether portable secure storage device 110 is in the administrative mode, and/or a connection state to the host 120. The output device 244 may also provide indications of other types of operation of the portable secure storage device, such as an indication that the device is locked or unlocked. The output device 244 may include any visual, auditory, tactile, and/or sensory output device to allow a user to detect an indication of the operation of the portable secure storage device 110. For example, output device 244 may include one or more multicolored light emitting diodes (LEDs) or LEDs with color tinted light guides. One or more implementations may include a device(s) that functions as both an input and output device, such as a touchscreen.

The communications module 238 of the portable secure storage device 110 is configured to connect the portable secure storage device 110 to the communication bus 130 external to the casing. The communications module 238 may include, or may be a part of, a single Standard-A USB plug to serve as a physical interface to the communication bus 130 in some examples, or the communications module 238 may include, or may be a part of, a micro USB plug in other examples. In yet another example, the communications module 238 may include, or may be a part of, a Type-C connector. These are examples, and the communications module 238 is not limited to these examples. The communications module 238 may be, for example, disposed partially within the casing and partially outside the portable secure storage device 110. In one or more examples, the communications module 238 is coupled to and protrudes from the casing.

In one or more implementations, the portable secure storage device 110 includes a battery(ies) (not shown) that may power the portable secure storage device 110 or a portion(s) thereof. In one example, the battery(ies) may power the controller 258 (or a portion(s) thereof), the physical input device 246, and/or the physical output device 244. The battery(ies) may be rechargeable, for example, by using bus or line power. In another implementation, the portable secure storage device 110 does not include a battery.

Still referring to FIG. 2, in one or more implementations, a controller 258 is coupled to the memory 232, the physical input device 246, the physical output device 244, and the communications module 238. The controller 258 may provide instructions to prevent or allow data transfer between the portable secure storage device 110 and an external system (e.g., the host 120).

In one example, a controller 258 is a single controller. In another example, a controller 258 includes multiple controllers (e.g., two controllers or more than two controllers). A controller may be sometimes referred to as a microcontroller, a multi-core controller, a controller module, a processor, a processor module, a microprocessor, a microprocessor module, or a portion(s) thereof or vice versa. A controller(s) within a controller 258 may be sometimes referred to as a microcontroller(s). A microcontroller may include one or more microcontrollers. When a controller 258 has multiple microcontrollers, each microcontroller may perform different functions, and a microcontroller may be implemented with a different level of security protection (e.g., a high, medium, or low security level). Such security level may be implemented in hardware, firmware, or a combination thereof.

A controller 258 may be a single integrated circuit (IC) chip (or a single die) or may include multiple IC chips. Multiple controllers within the controller 258 may be on a single chip. Multiple controllers within the controller 258 may be on separate chips.

In one or more implementations, a controller 258 is not a general purpose processing device. In one or more implementations, a controller 258 includes one or more application-specific digital signal processors or one or more application-specific integrated circuits. In one or more implementations, a controller 258 may include discrete hardware components or other suitable components that can perform the functions described herein. In one or more examples, a controller 258 (or one or more microcontrollers therein) is implemented in hardware and embedded firmware (without high-level software applications).

Microcontrollers within the controller 258 may be coupled, directly or indirectly, to each other, using communication links. A communication link may be a serial peripheral interface (SPI) bus for synchronous communication between the microcontrollers. A communication link may be a bidirectional communication link. A communication link may be an inter-integrated circuit ($I^2C$) bus, where one microcontroller is implemented as a master node and another microcontroller is implemented as a slave node, in some examples. These are examples, and a communication link is not limited to these examples.

In one or more implementations, a controller 258 includes a local memory 240. The local memory 240 may be a read-and-write memory, a read-only memory, EEPROM, registers, a volatile memory, a non-volatile memory, or a combination of some or all of the foregoing. A local memory 240 may be a single memory or multiple memories. A memory may include one or more memories. When a controller 258 includes multiple microcontrollers and multiple memories, each microcontroller may have its associated local memory(ies). Such local memory(ies) may reside within its corresponding microcontroller. Such local memory(ies) may reside outside its corresponding microcontroller. A memory may be implemented with a different level of security protection. The security level may be implemented in hardware, firmware, or a combination thereof.

The local memory 240 or a memory(ies) therein may be configured to store instructions and/or data, including parameters, flags, and/or information. The local memory 240 or a memory(ies) therein may store instructions/data that the controller 258, a microcontroller(s) therein, and/or another component(s) may need at runtime. From the local memory 240 (or a memory(ies) therein), the controller 258, a microcontroller(s) within the controller 258, and/or another component(s) may retrieve instructions to execute and data to process in order to execute the processes of the subject disclosure.

In one or more implementations, all instructions/data (e.g., configuration data, other data, indications, keys, instructions, parameters, flags and information) stored in the portable secure storage device 110 (e.g., 240) is encrypted or securely stored. In one or more other implementations, some instructions/data (e.g., a portion or some of configuration data, other data, indications, keys, instructions, parameters, flags and/or information) stored in the portable secure storage device 110 (e.g., 240) is encrypted or securely stored. In one or more yet other implementations, some instructions/data (e.g., configuration data, other data, indications, keys, instructions, parameters, flags and/or information) stored in the portable secure storage device 110 (e.g., 240) is not encrypted. In one or more implementations, the user data stored in the memory 232 is encrypted or securely stored.

In one or more implementations, configuration data of a portable secure storage device is settable or changeable by a user. For example, a user (or an administrator or an operator) may change configuration data such as security information (e.g., one or more PINs) or other configuration settings (e.g., auto-lock, lock-override, or other settings) associated with a configuration of the portable secure storage device. This change can be made by the portable secure storage device, for example, using a physical input device (e.g., 246) of the portable secure storage device. Security information may be sometimes referred to as a security identification code, a security personal identification code, a personal identification code, a security parameter(s), or vice versa.

In some aspects of the present technology, an indication of a disk type (i.e., a removable disk or a fixed disk) is set to one of the predetermined values (e.g., 0 for a removable disk and 1 for a fixed disk) and is stored within a portable secure storage device 110 (e.g., a register in a memory 240 or memory 232), and the predetermined value is convertible from one value to another by the controller 258 upon request (e.g., from a user). For example, the indication may be initially set to one of the predetermined values indicating a portable secure storage device 110 is a removable disk. Of course, in other aspects of the present technology, the indication may be initially set to the other predetermined value indicating that a portable secure storage device 110 is a fixed disk. After receiving a particular request (e.g., a sequence of inputs via an input device 246) for conversion, a controller 258 may convert the predetermined value stored within the portable secure storage device 110 to the other predetermined value and indicate that the portable secure storage device 110 is converted from being a removable disk to a fixed disk or from a fixed disk to a removable disk. The user may repeat a request for conversion as desired (e.g., from a fixed disk to a removable disk and vice versa), and the controller 258 may repeat the corresponding conversion upon request.

When a portable secure storage device 110 is a fixed disk and is formatted and partitioned (e.g., by the device 110 or a host 200) in a manner that is incompatible with a removable disk, the portable secure storage device 110 or the host operating system (or an application) may prompt a user to reformat the portable secure storage device 110 after the portable secure storage device 110 is converted from being a fixed disk to a removable disk. This may result in unintentional data loss. In some aspects of the present technology, the initial predetermined value for the indication may be preferably set to the predetermined value for a removable disk, as some operating systems may prompt the user to format and partition an uninitialized removable disk in a manner that is compatible with both a removable disk and a fixed disk. In this manner, conversion between a removable disk and a fixed disk may be performed without the portable secure storage device 110 or a host 200 prompting the user for destructive formatting, since the operating system may treat the partitioning information in the same manner whether a portable secure storage device 110 is a removable disk or a fixed disk.

In some aspects of the present technology, an indication within a portable secure storage device 110 (e.g., in a memory 240 or 232) may be stored as a Boolean flag or a single bit. In some aspects of the present technology, a physical input device 246 may include a dedicated switch or jumper for changing the indication. When a dedicated switch or jumper is provided, then a controller 258 may update the indication according to a physical state of the switch or jumper. When the switch or jumper is adjusted while a portable secure storage device 110 is in a powered off state, the controller 258 may update the indication stored within a portable secure storage device 110 upon startup. In some aspects of the present technology, the controller 258 may poll the switch or jumper to access the indication, rather than maintaining the indication in a memory 240 or 232.

Figure 3A:
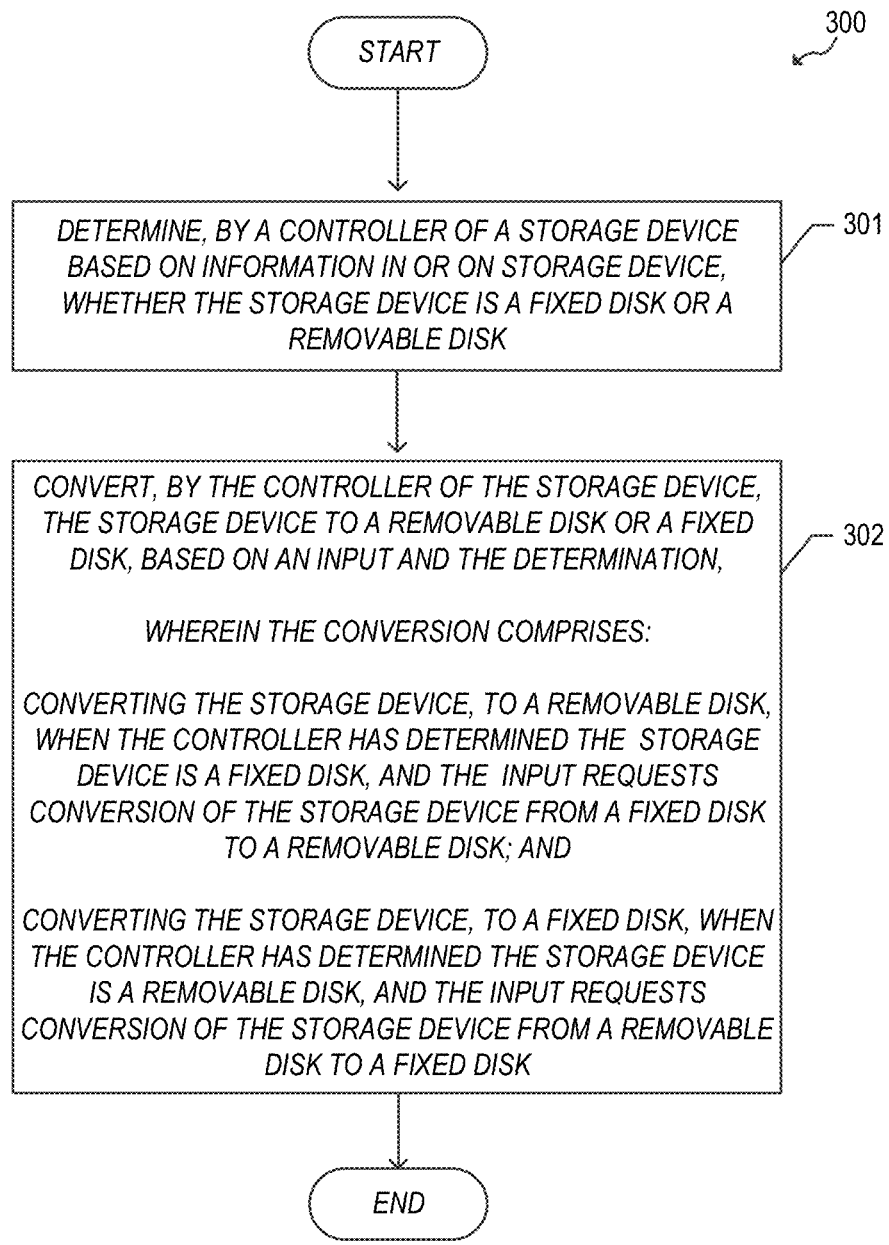
FIG. 3A illustrates an example of a process in which a storage device converts itself from being a removable disk to a fixed disk or vice versa.

FIG. 3A illustrates an example of a process 300 for a portable secure storage device self-converting between a removable disk and a fixed disk using an example portable secure storage device 110 of FIG. 2. While FIG. 3A is described with reference to FIG. 2, it should be noted that the process steps of FIG. 3A may be performed by other systems.

The process 300 begins by proceeding from the start step to step 301 when controller 258 of portable secure storage device 110 determines, based on information in or on portable secure storage device 110 (or stored within portable secure storage device 110), whether portable secure storage device 110 is a fixed disk or a removable disk. As discussed above, the information may correspond to an indication obtained from, for example, memory 240 or memory 232. In this example, controller 258 may read the indication directly from memory 240 or memory 232 (via a bidirectional communication link 254). In another example, the information may correspond to a state of a switch, jumper, or other device of input device 246. In this case, controller 258 may poll a state of input device 246, for example, by reading one or more memory mapped I/O ports of memory 240.

In step 302, controller 258 of portable secure storage device 110 converts portable secure storage device 110 to a removable disk or a fixed disk, based on a control input and the determining step 301. For example, the control input may be received from physical input device 246 and provided to controller 258, and may include a first sequence for entering an administrative mode, and a second sequence for requesting conversion of portable secure storage device 110 between a removable disk and a fixed disk. In some aspects of the present technology, the first sequence and/or the second sequence may be preset by the manufacturer and may or may not be modified by a user.

When the controller 258 determines that portable secure storage device 110 is a fixed disk and that the control input requests conversion of portable secure storage device 110 from being a fixed disk to a removable disk, controller 258 converts portable secure storage device 110, in its entirety, to a removable disk. For example, controller 258 may conduct interactions with host 120 in a manner consistent with a removable disk. Controller 258 may also store an indicator to reflect that portable secure storage device 110 is now being the removable disk. For example, if the indication is represented by a Boolean flag bit stored in memory 240 or memory 232, then a NOT operation may be applied to flip and store an updated flag bit. Controller 258 may also provide an output to output device 244 to reflect the conversion, for example, by turning on or turning off one or more LEDs or by changing one or more LED colors. All portions of memory 232 are converted from a fixed disk to a removable disk (or from a fixed disk mode to a removable disk mode).

When controller 258 determines that portable secure storage device 110 is a removable disk and that the control input requests conversion of portable secure storage device 110 from being a removable disk to a fixed disk, controller 258 converts the portable secure storage device 110, in its entirety, to a fixed disk. For example, controller 258 may conduct interactions with host 120 in a manner consistent with a fixed disk. Controller 258 may also store an indicator to reflect that portable secure storage device 110 is now being the fixed disk. For example, if the indication is represented by a Boolean flag bit stored in memory 240 or memory 232, then a NOT operation may be applied to flip and store an updated flag bit. The controller 258 may also provide an output to output device 244 to reflect the conversion, for example, by turning on or turning off one or more LEDs or by changing one or more LED colors. All portions of memory 232 are converted from a removable disk to a fixed disk (or from a removable disk mode to a fixed disk mode).

Note that process 300 may complete without any interactions with host 120 or communications over communication bus 130. Accordingly, a portable secure storage device 110 may carry out process 300 while not in communication with host 120. As discussed above, portable secure storage device 110 may include a power source such as a battery to enable independent operation of portable secure storage device 110.

In some aspects of the present technology, controller 258 may leave memory 232 as-is during step 302. For example, when on-the-fly conversion is permitted during operation of portable secure storage device 110, then memory 232 may be retained as-is to enable continued operation of portable secure storage device 110 on host 120. As discussed above, by configuring portable secure storage device 110 as a removable disk at manufacture or assembly time, portable secure storage device 110 may be more likely to be formatted and partitioned by operating system 222 in a manner that is compatible with portable secure storage device 110 being either the removable disk or the fixed disk.

In other aspects of the present technology, controller 258 may require a "reformat" of memory 232 during step 302. This ensures that the operating system of the host will cleanly reformat and partition memory 232 in a manner that is most suited for a fixed disk or a removable disk. While the term "reformat" is used with respect to memory 232, the term is not used in its strict sense and can be carried out in different ways that may not directly modify memory 232.

For example, one approach for reformatting memory 232 is for controller 258 to nullify an encryption key used to encrypt data to be stored into the memory 232 or to decrypt data read from memory 232. The term "nullify" may be sometimes described as erase, remove or zero out. In some aspects of the present technology, this may require controller 258 to generate a new encryption key. An encryption key is stored in portable secure storage device 110 (e.g., memory 240, memory 232 or another storage location(s)). As a result, when host 120 attempts to read memory 232, memory 232 appears to contain random data since controller 258 is now using a different encryption key to decrypt the secure data stored in memory 232 that was encrypted with a prior encryption key. Since memory 232 appears as random data to host 120, operating system 222 of host 120 may conclude that no valid partition tables are available in memory 232, and operating system 222 may prompt the user to format and partition the memory 232.

Another approach is for controller 258 to reset one or more settings of portable secure storage device 110, for example, by invalidating or resetting user and administrator PINs and/or resetting other configuration and security data stored in portable secure storage device 110 (e.g., memory 240, memory 232 or another storage location(s)). In some aspects, a reset may set one or more configuration and security settings to default values or random values. The reset may set the PIN(s) to random values or values that are not enterable from input device 246. For example, if input device 246 is a keypad having only alphanumeric keys, a reset PIN may contain one or more characters, symbols or other items that are not alphanumeric; hence, such reset PIN cannot be entered via the keypad. In one aspect, the reset PIN is not usable, recognizable, identifiable, acceptable, decipherable, detectable or processable by controller 258 or physical input device 246 (as a PIN) when such keypad is used, and such reset PIN is not usable to unlock portable secure storage device 110. In one or more aspects, there is no correspondence between at least a portion of the reset PIN and the keypad (any portion or the entire keypad), and at least a portion of the reset PIN does not correspond to (or represent, match or fit) any portion of the keypad.

After the reset, the portable secure storage device 110 may prompt the user for new PIN(s) and/or configuration settings before permitting unlocking and use of the portable secure storage device 110. In turn, setting the new PINs and/or configuration settings may require the controller 258 to generate a new encryption key.

Yet another approach is for controller 258 to perform a "quick format" that overwrites partition tables in header and footer sectors of memory 232, for example, with all binary zeroes, all binary ones, or random or patterned data. When the partition tables are overwritten, operating system 222 of host 120 may scan memory 232 and determine that no valid partition tables exist, and may therefore prompt the user to format and partition memory 232. While user data remains in memory 232 after such a "quick format," the user data is potentially recoverable through data recovery procedures, and this may be preferable to avoid unintentional data loss. Further, since the "quick format" can be performed relatively quickly compared to a full drive erase, portable secure storage device 110 can be made available for user operation more quickly after a conversion. However, for some highly secure applications, controller 258 may instead perform a full drive erase (e.g., all sectors of memory 232 are overwritten with all binary zeroes, all binary ones, or random or patterned data), or nullify the encryption key, as described above.

Since a reformat of memory 232 may result in potential data loss, controller 258 may request a user confirmation using output device 244 before continuing with a reformat or reset, for example, by flashing LEDs in a particular pattern. The user may provide an input sequence using input device 246 to confirm the reformat or reset. In some aspects of the present technology, the confirmation may be skipped after scanning memory 232 and determining that no user data is stored. For example, memory 232 may be determined to be in a factory or default state with no user data yet written. In another example, memory 232 may be scanned for an absence of valid partition tables.

Figure 3B:
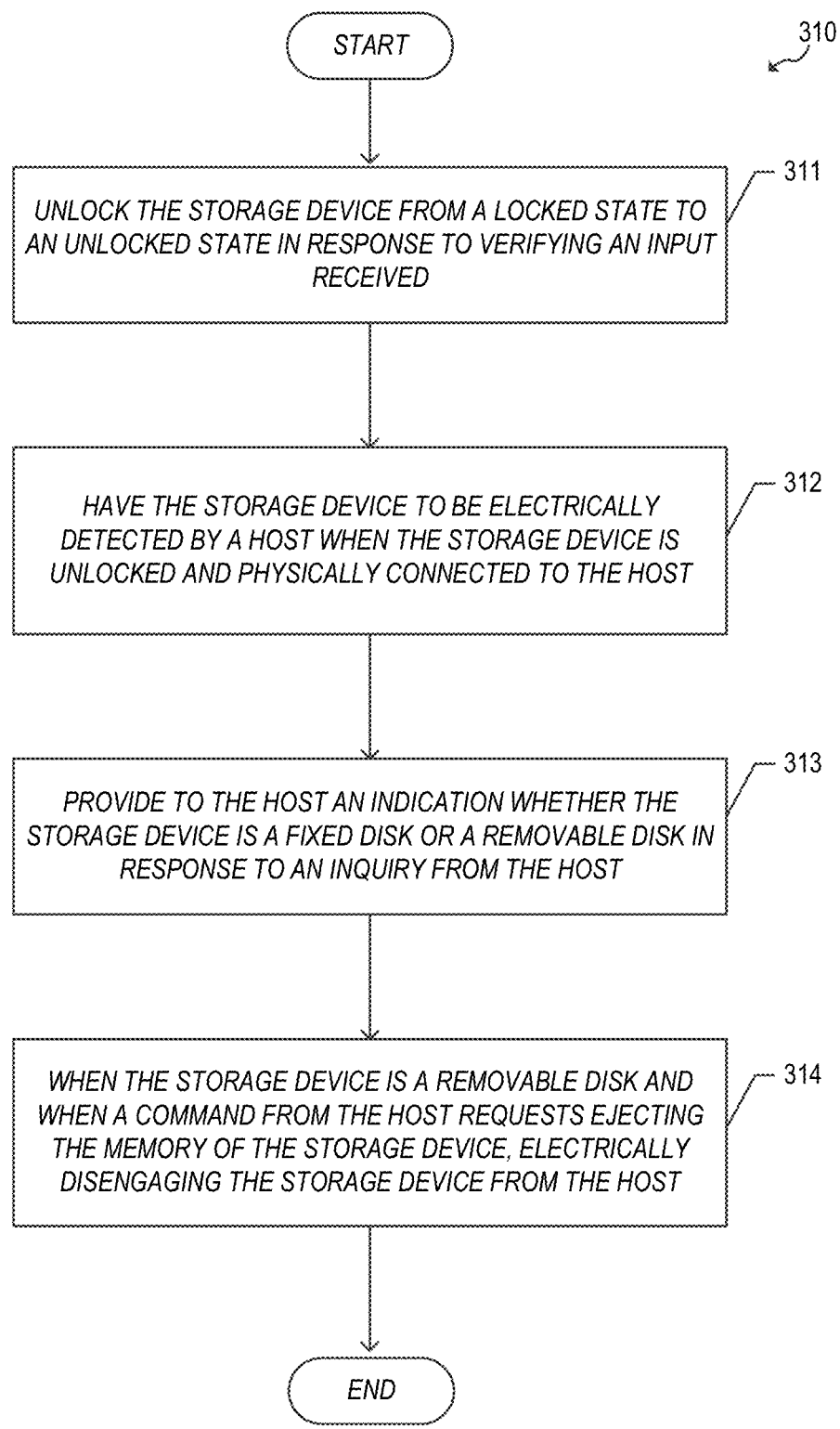
FIG. 3B illustrates an example of a process for a storage device electrically disengaging from a host.

FIG. 3B illustrates an example of a process 310 for a portable secure storage device electrically disconnecting from a host using an example portable secure storage device 110 and a host 120 of FIG. 2. While FIG. 3B is described with reference to FIG. 2, it should be noted that the process steps of FIG. 3B may be performed by other systems.

The process 310 begins by proceeding from the start step to step 311 when controller 258 unlocks portable secure storage device 110 from a locked state to an unlocked state in response to verifying an authentication input received from physical input device 246. For example, a user may enter a user PIN using physical input device 246. Controller 258 may then compare the entered PIN with a stored PIN in portable secure storage device 110 (e.g., memory 240, memory 232 or another location) to authenticate the user. Controller 258 may unlock portable secure storage device 110 when the PINs match, and may update a lock state value from a locked value to an unlocked value.

In step 312, controller 258 of portable secure storage device 110 allows portable secure storage device 110 to be electrically detected by host 120 when portable secure storage device 110 is unlocked after step 311 and is physically connected to host 120. For example, a user may physically connect a cable (e.g., a USB cable) between respective ports of portable secure storage device 110 and host 120 to establish communication bus 130. Communications module 238 may provide electrical resistance on data lines of communication bus 130, for example, via a pull-up resistor or an adjustable resistor, to enable host 120 to electrically detect a presence of portable secure storage device 110 on communication bus 130.

In step 313, controller 258 of portable secure storage device 110 provides to host 120 an indication whether portable secure storage device 110 is a fixed disk or a removable disk in response to an inquiry from host 120. For example, host 120 may determine that portable secure storage device 110 is a USB Mass Storage Class device and subsequently send a small computer system interface (SCSI) Inquiry to portable secure storage device 110 via communication bus 130. Controller 256 may populate a SCSI Inquiry data response, as shown below in Table 1.

TABLE 1

Standard INQUIRY Data.

| Byte | Bit | | | | | | | |
|---|---|---|---|---|---|---|---|---|
| | 7 | 6 | 5 | 4 | 3 | 2 | 1 | 0 |
| 0 | Peripheral Qualifier | | | | Peripheral Device Type | | | |
| 1 | RMB | | | | Reserved | | | |
| 2 | ISO Version | | | ECMA Version | | | ANSI Version | |
| 3 | ANEC | | Reserved | MESN | | Response Data Format | | |
| 4 | Additional Length | | | | | | | |
| 5-6 | Reserved | | | | | | | |
| 7 | RelAdr | Wbus32 | Wbus16 | Sync | Linked | Rsrvd | CmdQue | SftRe |
| 8-15 | Vendor Identification | | | | | | | |
| 16-31 | Product Identification | | | | | | | |
| 32-35 | Product Revision Level | | | | | | | |
| 36-55 | Vendor Specified | | | | | | | |
| 56-95 | Reserved | | | | | | | |
| | Vendor Specific Parameters | | | | | | | |
| 96-n | Vendor Specific | | | | | | | |

As shown in Table 1, the indication may be provided in byte #1, bit #7 field of the SCSI Inquiry data response, corresponding to the "RMB" or "Removable Media Bit" attribute. For example, the "RMB" is written as "0" when portable secure storage device 110 is a fixed disk, and the "RMB" is written as "1" when portable secure storage device 110 is a removable disk. The other portions of the SCSI Inquiry data response may be populated and provided to host 120 via communication bus 130.

Depending on the received SCSI Inquiry data response, host 120 may identify portable secure storage device 110 as a fixed disk or a removable disk. For example, referring to FIG. 4A, a peripheral bus identification utility executing on operating system 222 may provide user interface 400A for display on output device 214 when host 120 identifies portable secure storage device 110 as a fixed disk. The peripheral identification utility may provide user interface 400B for display on output device 214 when host 120 identifies portable secure storage device 110 as a removable disk, for example, after process 300 is carried out for portable secure storage device 110.

Note that in the example shown in FIG. 4A, operating system 222 may not support GUID Partition Table (GPT) on removable disks. Thus, the "Partition Map Type" is identified as "Unknown" in user interface 400B after process 300 is carried out for portable secure storage device 110, since operating system 222 may not scan removable disks for GPT partitions and may find the protective MBR partition instead. In this case, operating system 222 may prompt the user to format portable secure storage device 110 even though user data may still exist in GPT partitions. Alternatively, operating system 222 may not allow the user to interact with unknown partitions and may access portable secure storage device 110 in an unmounted read-only mode.

As discussed above, one workaround may include configuring portable secure storage device 110 as a removable disk at manufacture or assembly time so that operating system 222 prompts the user to format portable secure storage device 110 using a master boot record (MBR) partition, which operating system 222 may support for both the fixed disk and the removable disk. Alternatively, a "reformat" of memory 232 may be forced after each conversion, as discussed above.

Figure 4C:
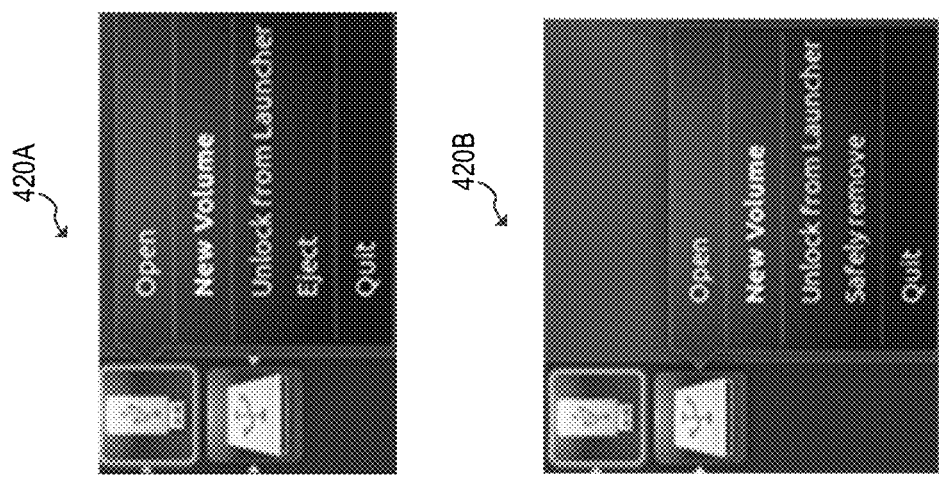
Figure 4D:
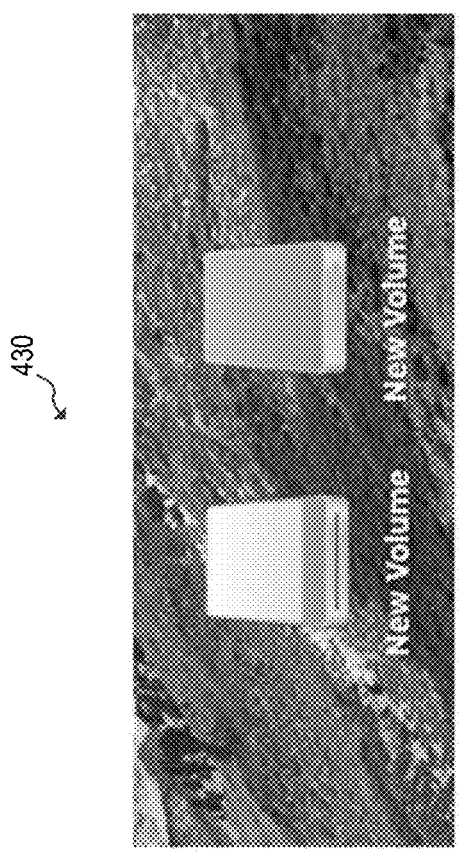

FIGS. 4B, 4C, and 4D illustrate example graphical user interfaces of operating system 222 of host 120 displayed on output device 214 after step 313. FIG. 4B illustrates an example where operating system 222 corresponds to Windows®. When step 313 indicates that portable secure storage device 110 is the removable disk, then operating system 222 may output user interface 410A to output device 214. As shown in user interface 410A, the user is provided with the option to "eject" portable secure storage device 110 (Disk 1).

When step 313 indicates that portable secure storage device 110 is the fixed disk, then operating system 222 may output user interface 410B to output device 214. As shown in user interface 410B, an option to "eject" a portable secure storage device 110 (Disk 2) is not provided. Instead, to remove portable secure storage device 110 (Disk 2), the user may use a "safely remove hardware" tray icon to remove portable secure storage device 110. Note that in the example shown in FIG. 4B, two portable secure storage devices 110 are connected to host 120, which respectively identify as the removable disk (Disk 1) and the fixed disk (Disk 2).

FIG. 4C illustrates an example where operating system 222 corresponds to Linux. When step 313 indicates that portable secure storage device 110 is the removable disk, then operating system 222 may output user interface 420A to output device 214. As shown in user interface 420A, the user is provided with the option to "eject" portable secure storage device 110 (identified by the top icon on the left).

When step 313 indicates that portable secure storage device 110 is the fixed disk, then operating system 222 may output user interface 420B to output device 214. As shown in user interface 420B, an option to "eject" a portable secure storage device 110 (identified by the bottom icon on the left) is not provided. Instead, to remove portable secure storage device 110 (the bottom icon on the left), the user may use the "Safely remove" option. Note that in the example shown in FIG. 4C, two portable secure storage devices 110 are connected to host 120, which respectively identify as the removable disk (top icon on the left) and the fixed disk (bottom icon on the left).

FIG. 4D illustrates an example where operating system 222 corresponds to Mac OS®. Operating system 222 may output user interface 430A to output device 214. As shown in user interface 430, fixed disks and removable disks may be distinguished using different colored icons, and the removable disk icon may include an opening or slit to indicate that media can be "ejected" from removable disks. Note that in the example shown in FIG. 4D, two portable secure storage devices 110 are connected to host 120, which respectively identify as the removable disk (left icon) and the fixed disk (right icon).

In step 314, controller 258 of portable secure storage device 110 electrically disengages portable secure storage device 110 from host 120 when portable secure storage device 110 is a removable disk and when a command from host 120 requests ejecting memory 232 of portable secure storage device 110. For example, if step 313 identifies portable secure storage device 110 as a removable disk, then in response, operating system 222 provides user interface controls to allow the user to "eject" memory 232 of portable secure storage device 110, as described above in conjunction with user interfaces 410A and 420A.

However, an "eject" command issued to portable secure storage device 110 by operating system 222 may request ejecting the media, or memory 232, rather than the entire storage device from host 120 (i.e., portable secure storage device 110 in its entirety). This distinction may be useful for devices with removable media such floppy drives, optical drives, and flash card readers, as host 120 can retain a connection with the storage device so that the user can insert a new floppy, optical disc, or flash card and continue working. However, a "drive" (or a storage device) with integrated "media" such as portable secure storage device 110 with memory 232 has no reason to "eject" only memory 232 while retaining a connection to host 120.

For example, host 120 may issue an eject command to portable secure storage device 110 that includes a USB command requesting a transition to a lower power link state U1, as identified below in Table 2.

TABLE 2

Logical Save Link States defined in USB 3.0.

| Link State | Description | Key Characteristics | Exit Latency |
|---|---|---|---|
| U0 | Link Active | | NA |
| U1 | Link Idle, Fast Exit | RX & TX Circuit Quiesced | μs range |
| U2 | Link Idle, Slow Exit | Clock Generation Circuit also Quiesced | Low ms range |
| U3 | Suspend | Portions of device power removed | Higher ms range |

Figure 4E:
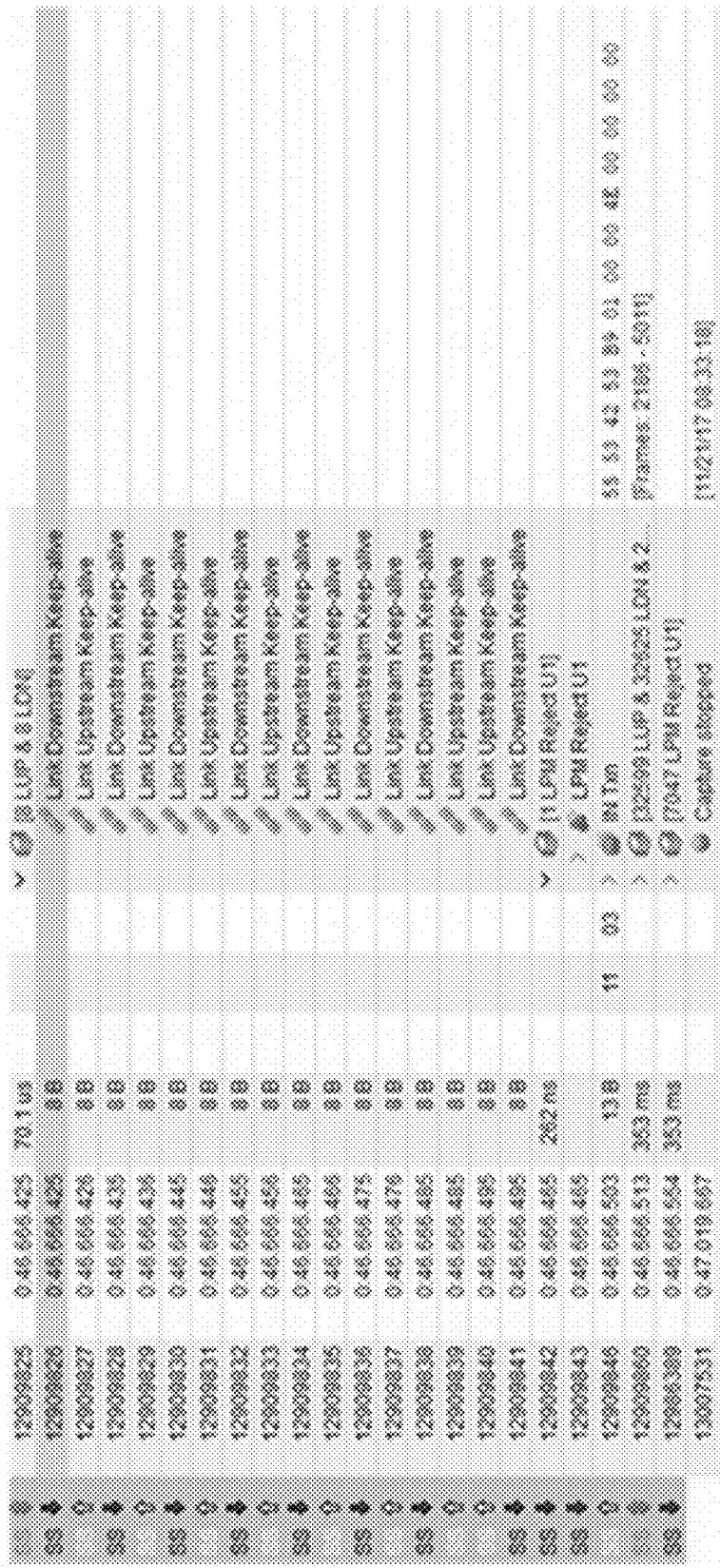

Controller 258 of portable secure storage device 110 may respond to the eject command by disconnecting memory 232 (i.e., the storage volume) and rejecting the U1 transition request, as illustrated by a communication log shown in user interface 440A of FIG. 4E. Note that if portable secure storage device 110 were to remain on communication bus 130, keep-alive messages would exchange between host 120 and portable secure storage device 110, which would increase processing overhead and power consumption on host 120. These keep-alive messages are redundant after disconnecting memory 232 since portable secure storage device 110 does not connect to (or receive) a different or new memory.

Figure 4F:
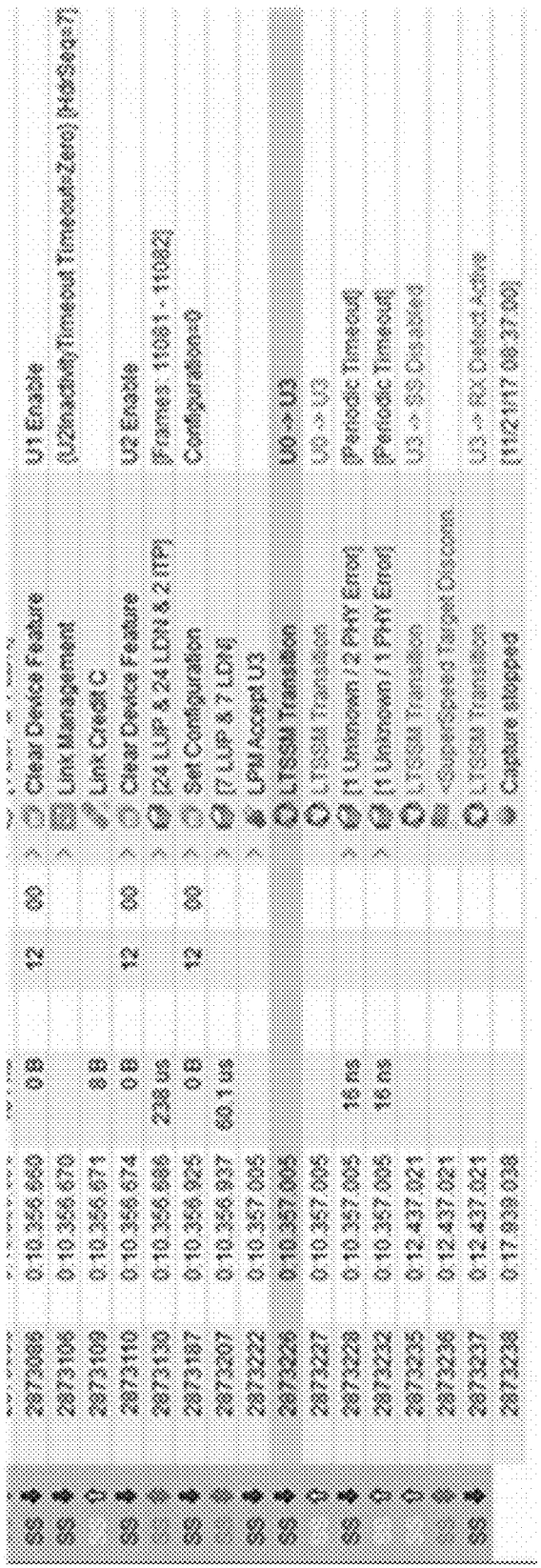

Accordingly, in step 314, controller 258 of portable secure storage device 110 provides a command that electrically disengages portable secure storage device 110 from host 120 when a command from host 120 requests ejecting memory 232 of portable secure storage device 110. The process is illustrated by a communication log shown in user interface 440B of FIG. 4F. For example, after receiving the eject command from host 120, controller 258 of portable secure storage device 110 may respond by issuing a command that electrically disengages (or disconnects) portable secure storage device 110 from host 120. Host 120 may detect the electrical disconnection and quickly transition the USB port to a low power U3 state as shown above in Table 2 and disable SuperSpeed mode, thereby improving performance and reducing power consumption of host 120.

To electrically disengage in step 314, controller 258 may prevent portable secure storage device 110, which is physically connected to host 120, from being recognized (or being detected) by host 120 and/or from communicating with host 120. For example, controller 258 may electrically disconnect one or more data lines using switches or other circuit components, controller 258 may turn off a pull-up resistor connected to the data lines, or controller 258 may adjust an adjustable resistor connected to the data lines.

To electrically disengage in step 314, controller 258 may force a reset of portable secure storage device 110. For example, the reset may place portable secure storage device 110 into a state where host 120 cannot recognize portable secure storage device 110.

To electrically disengage in step 314, controller 258 may cause some or all of power, which is supplied by host 120 to portable secure storage device 110, to be removed from portable secure storage device 110. For example, controller 258 may electrically disconnect one or more power lines using switches or other circuit components.

In accordance with one or more aspects, below describes examples of differences between aspects of a fixed disk and a removable disk. However, in some aspects, the distinction of these attributes may not be treated equally by all operating systems.

In one aspect, a removable disk is ejectable. For example, in the case of a backup tape, a CD-ROM, or another tape, a drive itself (or a storage device) that holds tapes or CD's is not ejectable but the media (e.g., tapes or CD's) contained inside the drive is ejectable (or removable). In the case of a USB flash drive, the volume can be ejected, but the drive itself remains. When a fixed disk is "safely removed," the entire drive is removed (or electrically removed) from the host operating system, even if it is still physically connected.

In analyzing the USB commands, the "eject" and "safely remove" options are treated differently. When a user "safely removes" a drive, the bus between the host and the drive changes the drive power state from a U0 state to a U3 suspend state, removes power from the drive, disables "SuperSpeed" and then puts the bus in a state to receive commands again.

In the event of the "eject," the host only sends (via the bus) the standard U1 request to the drive. When the drive is a typical removable disk, the drive and the host maintain a keep-alive state sending a two-way query every couple of seconds. When a drive is a removable disk implemented according to one or more aspects of the subject technology, the drive may decline the U1 request, and electrically remove the entire drive from the host.

It is noted that a removable disk may deny or delay an "eject" request when there is a write in progress. The host Windows® operation system allows a removable disk to be ejected or safely removed.

A fixed disk may contain multiple partitions. A removable disk may contain multiple partitions, but the host operating system can usually only access the first partition. If there are other partitions, they are typically not mounted or assigned drive letters. For this reason, most removable disks typically contain only a single partition.

In some implementations, however, Linux and Mac OSX® operating systems allow a user to create and access multiple partitions on a removable disk. Windows® 10, starting with the Creators Update (version 1703) also allow a user to create and access multiple partitions on a removable disk. All previous versions of the Windows® operating systems only allow access to a single partition (the first partition) on a removable disk.

A removable disk uses direct writes to the drive. Since the drive is removable, all writes to the drive are written directly to the drive instead of allowing disk caching. This reduces the chance of data corruption if the drive is removed, either accidentally or on purpose. A fixed drive, by default, allows the host operating system to cache writes to the drive, which can improve overall performance. Fixed disks can offer options to allow the user to determine if caching is allowed. In some aspects, removable disks do not allow the caching option to be modified.

Figure 5:
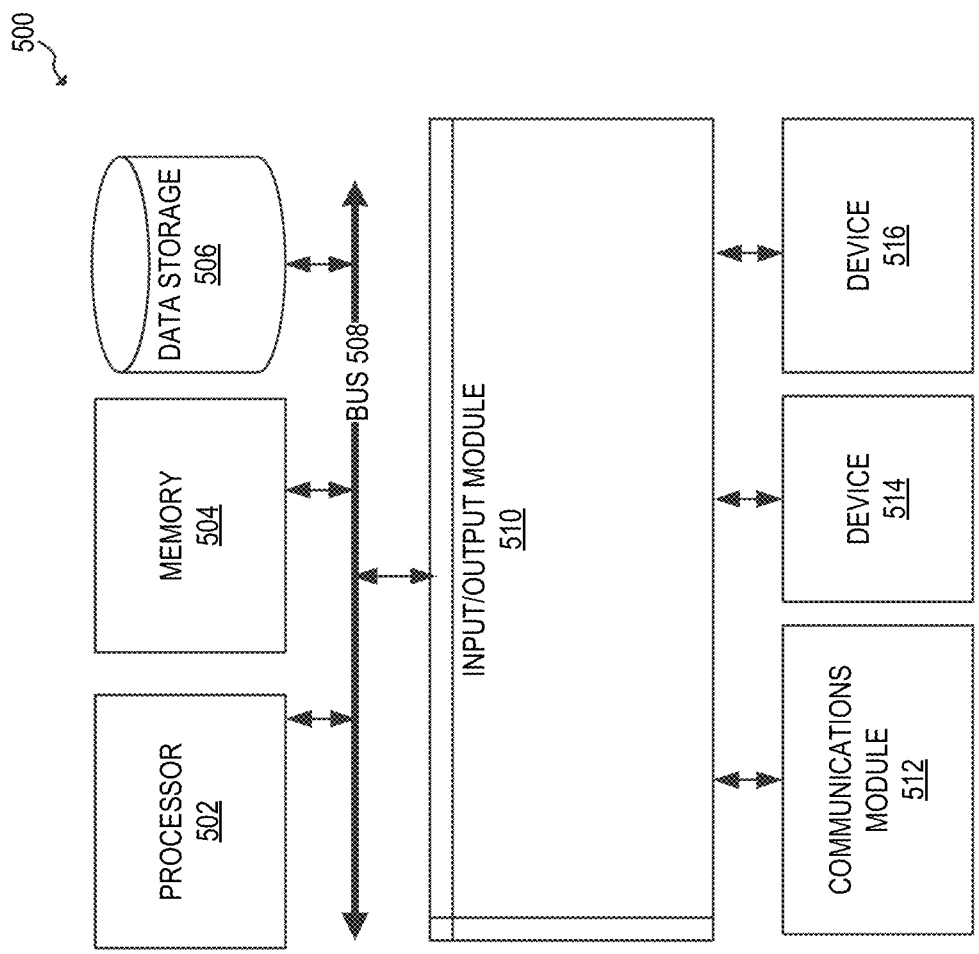
FIG. 5 is a block diagram illustrating an example of a computer system with which a host can be implemented.

FIG. 5 is a block diagram illustrating an exemplary computer system 500 with which the host 120 of FIG. 1 can be implemented. In certain aspects, the computer system 500 may be implemented using hardware or a combination of software and hardware, in a dedicated client device, integrated into another entity, or distributed across multiple entities.

The computer system 500 (e.g., host 120) includes a bus 508 or other communication mechanism for communicating information, and a processor 502 (e.g., processor 212) coupled with the bus 508 for processing information. By way of example, the computer system 500 may be implemented with one or more processors 502. A processor 502 may be a general-purpose microprocessor, a microcontroller, a digital signal processor, an application specific integrated circuit, discrete hardware components, or any other suitable hardware that can perform calculations or other manipulations of information.

The computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220), such as a random access memory (RAM), a flash memory, registers, a hard disk, a removable disk or any other suitable storage device, for storing information and instructions to be executed by a processor 502.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art. The memory 504 may also be used for storing temporary variable or other intermediate information during execution of instructions to be executed by the processor 502.

A computer program as discussed herein does not necessarily correspond to a file in a file system. A computer program can be deployed to be executed on one computer or on multiple computers that are located at one site or distributed across multiple sites and interconnected by a communication network. The processes and logic flows described in this disclosure can be performed by one or more programmable processors executing one or more computer programs to perform functions by operating on input data and generating output.

The computer system 500 further includes a data storage unit 506 such as a magnetic disk or optical disk, coupled to bus 508 for storing information and instructions. The computer system 500 may be coupled via an input/output module 510 to various devices. Exemplary input/output modules 510 include data ports such as USB ports. The input/output module 510 is configured to connect to a communications module 512. Exemplary communications modules 512 (e.g., communications modules 218) include a USB interface and networking interface cards, such as Ethernet cards and modems. In certain aspects, the input/output module 510 is configured to connect to a plurality of devices, such as an input device 514 (e.g., input device 216) and/or an output device 516 (e.g., output device 214). Exemplary input devices 514 include a keyboard and a pointing device. Other kinds of input devices 514 can be used, such as a tactile input device, visual input device, audio input device, or brain-computer interface device. Exemplary output devices 516 include display devices, such as a liquid crystal display (LCD) monitor, for displaying information to the user.

According to one aspect of the present disclosure, a computing device (e.g., 500, 120, 110, 200) can be implemented using a computer system in response to a processor (e.g., 502, 212, 258, or a sub-component) executing one or more sequences of one or more instructions contained in a memory (e.g., 504, 220, 240). Such instructions may be read into the memory (e.g., 504, 220, 240) from another machine-readable medium, such as a data storage unit (e.g., 506, 232). Execution of the sequences of instructions contained in the memory (e.g., 504, 220, 240) causes the processor (e.g., 502, 212, 258, or a sub-component) to perform the process steps described herein. One or more processors in a multi-processing arrangement may also be employed to execute the sequences of instructions contained in the memory (e.g., 504, 220, 240). In some aspects, hard-wired circuitry may be used in place of or in combination with software instructions to implement various aspects of the present disclosure. Thus, some aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components.

The term "machine-readable storage medium," "computer readable medium" or "medium" may refer to any medium or media that participate in providing instructions to a processor (e.g., 502, 212, 258 or a sub-component) for execution. Such a medium may take many forms, including, but not limited to, non-volatile media and volatile media. Non-volatile media include, for example, optical or magnetic disks, such as a data storage unit (e.g., 506, 232). Volatile media include dynamic memory, such as a memory 504. Common forms of machine-readable media include, for example, a flexible disk, a hard disk, a magnetic medium, a CD-ROM, DVD, any other optical medium, a RAM, a PROM, an EEPROM, a FLASH EPROM or any other medium from which a computer can read. The machine-readable storage medium can be a machine-readable storage device, a machine-readable storage substrate, a memory device, or a combination of one or more of them.

Various examples of aspects of the disclosure are described below as clauses and sentences for convenience. These are provided as examples, and do not limit the subject technology.

In one or more implementations, portable secure storage device 110 may be a storage device without a physical input device (thus a user does not enter a security identification code via the physical input device) and/or without an output device. In one or more implementations, portable secure storage device 110 may be a storage device configured to store unencrypted data (e.g., in memory 232). In one or more implementations, portable secure storage device 110 may be a storage device without any encryption keys.

In one or more implementations, a controller of a storage device electrically disconnects the storage device from a host when the storage device is a removable disk and when a command from the host requests ejecting a memory within the storage device. The electrical disconnection may cause one or more operations described herein for electrical disengagement. In one or more implementations, a controller of a storage device electrically removes the storage device from a host when the storage device is a removable disk and when a command from the host requests ejecting a memory within the storage device. The electrical removal may cause one or more operations described herein for electrical disengagement.

In one or more aspects, a fixed drive (or fixed disk) has been typically a storage device in which a storage medium (or media) is permanently attached within the storage device. In one or more aspects, a removable drive (or removable disk) has been typically a storage device in which a storage medium (or media) contained within the storage device is removable from the storage device. A floppy drive, a CD-ROM drive, and a DVD drive are examples of such typical removable drives.

In one or more aspects of the subject technology, a drive (or storage device), such as a flash drive, a hard drive, a SATA drive, a solid state drive, and/or other types of drives, is initially a fixed disk or a removable disk, and it can convert by itself from being a fixed disk to a removable disk or from being a removable disk to a fixed disk. These conversion processes can be repeated.

Various aspects of the subject matter may be implemented in the following manner. In one or more aspects, a storage device is self-transformable between a fixed disk and a removable disk and utilizes one or more operations described herein (e.g., operations described herein with respect to self-conversion). In one or more aspects, a storage device is self-switchable between a fixed disk and a removable disk and utilizes one or more operations described herein. In one or more aspects, a storage device is self-selectable between a fixed disk and a removable disk and utilizes one or more operations described herein. In one or more aspects, a storage device is user convertible between a fixed disk and a removable disk and utilizes one or more operations described herein (e.g., operations described herein with respect to self-conversion). In one or more aspects, a storage device is user transformable between a fixed disk and a removable disk and utilizes one or more operations described herein. In one or more aspects, a storage device is user switchable between a fixed disk and a removable disk and utilizes one or more operations described herein. In one or more aspects, a storage device is user selectable between a fixed disk and a removable disk and utilizes one or more operations described herein.

In one or more aspects, a device type is self-convertible between a fixed disk and a removable disk and utilizes one or more operations described herein (e.g., operations described herein with respect to self-conversion). In one or more aspects, a device type is self-transformable between a fixed disk and a removable disk and utilizes one or more operations described herein. In one or more aspects, a device type is self-switchable between a fixed disk and a removable disk and utilizes one or more operations described herein. In one or more aspects, a device type is self-selectable between a fixed disk and a removable disk and utilizes one or more operations described herein. In one or more aspects, a device type is user convertible between a fixed disk and a removable disk and utilizes one or more operations described herein (e.g., operations described herein with respect to self-conversion). In one or more aspects, a device type is user transformable between a fixed disk and a removable disk and utilizes one or more operations described herein. In one or more aspects, a device type is user switchable between a fixed disk and a removable disk and utilizes one or more operations described herein. In one or more aspects, a device type is user selectable between a fixed disk and a removable disk and utilizes one or more operations described herein.

In one or more implementations, a portable secure storage device is self-convertible from being a fixed disk to a removable disk and from being the removable disk to the fixed disk. The storage device may comprise: a casing; a memory disposed within the casing and configured to store encrypted data; a physical input device disposed at an outer surface of the casing and configured to facilitate unlocking of the portable secure storage device; and a controller disposed within the casing and coupled to the memory and the physical input device. The controller may be configured to cause: determining, by the controller of the portable secure storage device based on information in or on the portable secure storage device, whether the portable secure storage device is the fixed disk or the removable disk; and converting, by the controller of the portable secure storage device, the portable secure storage device to the removable disk or the fixed disk, based on a first input and the determining. The converting by the controller of the portable secure storage device may comprise: converting, by the controller, the portable secure storage device in its entirety, to the removable disk, when the controller has determined the portable secure storage device is the fixed disk, and the first input requests conversion of the portable secure storage device from being the fixed disk to the removable disk; and converting, by the controller, the portable secure storage device in its entirety, to the fixed disk, when the controller has determined the portable secure storage device is the removable disk, and the first input requests conversion of the portable secure storage device from being the removable disk to the fixed disk.

In one or more aspects, the controller is configured to cause: unlocking the portable secure storage device from a locked state to an unlocked state in response to verifying a second input received from the physical input device; having the portable secure storage device to be electrically detected by a host when the portable secure storage device is unlocked and physically connected to the host; providing to the host an indication whether the portable secure storage device is the fixed disk or the removable disk in response to an inquiry from the host; and when the portable secure storage device is the removable disk and when a command from the host requests ejecting the memory of the portable secure storage device, electrically disengaging the portable secure storage device from the host.

In one or more aspects, the electrically disengaging the portable secure storage device from the host comprises preventing the portable secure storage device, which is physically connected to the host, from being recognized by the host.

In one or more aspects, the electrically disengaging the portable secure storage device from the host comprises preventing the portable secure storage device from communicating with the host.

In one or more aspects, the electrically disengaging the portable secure storage device from the host comprises forcing a reset of the portable secure storage device.

In one or more aspects, the electrically disengaging the portable secure storage device from the host comprises causing some or all of power, which is supplied by the host to the portable secure storage device, to be removed from the portable secure storage device.

In one or more aspects, the command from the host is a universal serial bus (USB) command requesting a transition to a U1 state.

In one or more aspects, the command from the host is not a request to electrically disengage the portable secure storage device from the host.

In one or more aspects, the inquiry from the host is a small computer system interface (SCSI) inquiry command, and the providing to the host causes writing an indication, whether the portable secure storage device is the fixed disk or the removable disk, into a removable media bit field of a SCSI inquiry data response.

In one or more aspects, the controller is configured to cause the determining and the converting by the controller of the portable secure storage device, while the portable secure storage device is not in communication with a host, and the physical input device is configured to receive the first input and provide the first input to the controller.

In one or more aspects, the converting by the controller of the portable secure storage device comprises reformatting the memory of the portable secure storage device.

In one or more aspects, the controller of the portable secure storage device stores an indication whether the portable secure storage device is the fixed disk or the removable disk.

In one or more implementations, a storage device is self-transformable from being a fixed disk to a removable disk and from being the removable disk to the fixed disk. The storage device may comprise: a memory configured to store data; and a controller coupled to the memory. The controller is configured to cause: determining, by the controller of the storage device, whether the storage device is the fixed disk or the removable disk; and transforming, by the controller of the storage device, the storage device to the removable disk or the fixed disk, based on an input and the determining. The transforming by the controller of the storage device may comprise: transforming the storage device to the removable disk, when the controller has determined the storage device is the fixed disk, and the input requests transformation of the storage device from being the fixed disk to the removable disk; and transforming the storage device to the fixed disk, when the controller has determined the storage device is the removable disk, and the input requests transformation of the storage device from being the removable disk to the fixed disk.

In one or more aspects, when the storage device is the removable disk, and when a command from a host, connected to the storage device, requests ejecting the memory of the storage device, the controller is configured to cause electrically disengaging the storage device from the host.

In one or more aspects, the electrically disengaging the storage device from the host comprises preventing the storage device, which is physically connected to the host, from being recognized by the host.

In one or more aspects, the controller is configured to cause the determining and the transforming by the controller of the storage device, while the storage device is not in communication with a host.

In one or more aspects, the transforming by the controller of the storage device comprises reformatting the memory of the storage device.

In one or more aspects, the controller of the storage device stores an indication whether the storage device is the fixed disk or the removable disk.

In one or more implementations, a storage device provides user selectable device type modes. The storage device may comprise: a memory configured to store data; a mode indicator characterizing the memory, the mode indicator set to a predetermined value comprising one of a fixed disk mode or a removable disk mode; and a controller coupled to the memory. The controller is configured to cause: receiving a first input for changing the mode indicator; and changing the mode indicator in response to the first input, wherein the mode indicator is changed to the removable disk mode when the predetermined value is the fixed disk mode, and wherein the mode indicator is changed to the fixed disk mode when the predetermined value is the removable disk mode.

The controller may be further configured to cause: determining that the mode indicator is the removable disk mode; unlocking the storage device in response to verifying a second input received from a physical input device; connecting to a host in response to the storage device being unlocked and coupled to the host; providing the mode indicator to the host in response to an inquiry from the host; receiving a state transition command from the host for responding to an eject request for the memory; and decoupling the storage device electrically from the host in response to receiving the state transition command. Receiving the state transition command is over a USB bus and indicates a transition to a U1 state. Decoupling the storage device electrically from the host comprises asserting an I/O pin of the controller to trigger a hard reset of the storage device. The inquiry from the host is a SCSI Inquiry command. Providing the mode indicator populates a SCSI Inquiry data response with a Removable Media Bit field containing the mode indicator. Receiving the first input and changing the mode indicator occur while the storage device is without a connection to a host. The first input comprises a first sequence for entering an administrative mode and a second sequence for changing the mode indicator. The storage device may be portable. The storage device may be secure, and the stored data may be encrypted. The storage device may include a physical input device configured to facilitate unlocking of the storage device.

In one or more aspects, additional clauses are described below.

A method comprising one or more methods or operations described herein.

An apparatus comprising one or more memories (e.g., 240, 232, 220, one or more memories, or one or more registers) and one or more processors (e.g., 258, 212) coupled to the one or more memories, the one or more processors configured to cause the apparatus to perform one or more methods or operations described herein.

A hardware apparatus comprising circuits (e.g., 258, 212) configured to perform one or more methods, operations, or portions thereof described herein.

An apparatus comprising means (e.g., 258, 212) adapted for performing one or more methods or operations described herein.

A computer-readable storage medium (e.g., 240, 232, 220, one or more memories, one or more registers, and/or one or more media) comprising instructions stored therein, the instructions comprising code for performing one or more methods or operations described herein.

A computer-readable storage medium (e.g., 240, 232, 220, one or more memories, one or more registers, and/or one or more media) storing instructions that, when executed by one or more processors (e.g., 258, 212), cause one or more processors to perform one or more methods, operations or portions thereof described herein.

In one aspect, a method may be an operation, an instruction, or a function and vice versa. In one aspect, a clause or a claim may be amended to include some or all of the words (e.g., instructions, operations, functions, or components) recited in other one or more clauses, one or more sentences, one or more phrases, one or more paragraphs, and/or one or more claims. A clause or a claim may have multiple dependencies based on any of the other clauses or claims.

An example of the present disclosure may be an article of manufacture in which a non-transitory machine-readable medium (such as microelectronic memory) has stored thereon instructions which program one or more data processing components (generically referred to here as a "processor" or "processing unit") to perform the operations described herein. In other examples, some of these operations may be performed by specific hardware components that contain hardwired logic. Those operations may alternatively be performed by any combination of programmed data processing components and fixed hardwired circuit components.

In some cases, an example of the present disclosure may be an apparatus (e.g., a secure flash storage device) that includes one or more hardware and firmware/software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

To illustrate the interchangeability of hardware, firmware and software, items such as the various illustrative blocks, modules, components, methods, operations, instructions, and algorithms have been described generally in terms of their functionality. Whether such functionality is implemented as hardware, firmware or software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, contain or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions. The term coupling, connecting, or the like is intended to include direct and indirect coupling and direct and indirect connecting. The term coupled, connected, or the like is intended to include directly and indirectly coupled and directly and indirectly connected.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. Unless explicitly stated otherwise, these may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A portable secure storage device that is resettable to be a removable disk or a fixed disk, comprising:
   a casing;
   a physical input device disposed on or at an outer surface of the casing and configured to facilitate unlocking of the portable secure storage device;
   a memory disposed within the casing and configured to store a mode indicator indicating that the portable secure storage device is the removable disk or the fixed disk; and
   one or more microprocessors disposed within the casing, wherein the one or more microprocessors are configured to cause:
     receiving a first input obtained at the physical input device of the portable secure storage device;
     based on the first input, having the portable secure storage device enter into an administrative mode;
     while in the administrative mode, receiving a second input obtained at the physical input device of the portable secure storage device;
     based on the second input, resetting the portable secure storage device to the fixed disk or the removable disk, wherein the resetting comprises:
       determining, by the one or more microprocessors of the portable secure storage device without communicating with a host, whether the second input corresponds to the fixed disk or the removable disk;
       resetting, by the one or more microprocessors of the portable secure storage device without communicating with the host, the portable secure storage device to the fixed disk, when the second input corresponds to the fixed disk; and
       resetting, by the one or more microprocessors of the portable secure storage device without communicating with the host, the portable secure storage device to the removable disk, when the second input corresponds to the removable disk.

2. The portable secure storage device of claim 1, wherein:
   while not in communication with the host, the one or more microprocessors are configured to cause: receiving the first input, having the portable secure storage device enter into the administrative mode; and receiving the second input;
   when the portable secure storage device is reset to the fixed disk, the one or more microprocessors cause the memory to store the mode indicator indicating that the portable secure storage device is the fixed disk; and
   when the portable secure storage device is reset to the removable disk, the one or more microprocessors cause the memory to store the mode indicator indicating that the portable secure storage device is the removable disk.

3. The portable secure storage device of claim 1, further comprising:
   a physical output device disposed on or at the outer surface and configured to display whether the portable secure storage device is the removable disk or the fixed disk,
   wherein the physical output device comprises multicolored light emitting diodes (LEDs), and wherein the one or more microprocessors are configured to cause turning on or turning off one or more of the LEDs to indicate whether the portable secure storage device is the removable disk or the fixed disk.

4. The portable secure storage device of claim 3, wherein the physical input device is an alphanumeric keypad, wherein the alphanumeric keypad comprises buttons, wherein the first input comprises a first sequence of one or more of the buttons, wherein the second input comprises a second sequence of one or more of the buttons, and wherein prior to receiving the first input, the first sequence and the second sequence have been preset.

5. The portable secure storage device of claim 4, wherein:
   prior to receiving the first input, the portable secure storage device is pre-configured as the removable disk;
   the portable secure storage device comprises: a universal serial bus (USB) plug for communicating with the host; and a second memory for storing encrypted data;
   the one or more microprocessors are configured to cause having the portable secure storage device enter into the administrative mode when an administrator personal identification number (PIN) entered at the physical input device is verified; and
   the administrator PIN is different from a user PIN.

6. The portable secure storage device of claim 1, wherein when the portable secure storage device is the removable disk and when the portable secure storage device is in communication with the host, the portable secure storage device allows the host to display an indication that a medium within the portable secure storage device is ejectable, and
   wherein when the portable secure storage device is the fixed disk and when the portable secure storage device is in communication with the host, the portable secure storage device prevents the host from indicating that the medium within the portable secure storage device is ejectable.

7. The portable secure storage device of claim 6, wherein when the portable secure storage device is the fixed disk and when the portable secure storage device is in communication with the host, the portable secure storage device allows the host to display an indication to safely remove the portable secure storage device.

8. The portable secure storage device of claim 1, wherein the one or more microprocessors are configured to cause:
   unlocking the portable secure storage device from a locked state to an unlocked state in response to verifying the first input or a third input received from the physical input device;
   having the portable secure storage device to be electrically detected by the host when the portable secure storage device is unlocked and physically connected to the host;
   providing to the host an indication whether the portable secure storage device is the fixed disk or the removable disk in response to an inquiry from the host; and
   when the portable secure storage device is the removable disk and when a command from the host requests ejecting a medium of the portable secure storage device, electrically disengaging the portable secure storage device from the host, wherein the command from the host is not a request to electrically disengage the portable secure storage device from the host.

9. The portable secure storage device of claim 8, wherein the electrically disengaging the portable secure storage device from the host comprises preventing the portable secure storage device, which is physically connected to the host, from being recognized by the host, and wherein the electrically disengaging the portable secure storage device from the host comprises preventing the portable secure storage device from communicating with the host.

10. The portable secure storage device of claim 8, wherein the electrically disengaging the portable secure storage device from the host comprises forcing a reset of the portable secure storage device, and wherein the electrically disengaging the portable secure storage device from the host comprises causing some or all of power, which is supplied by the host to the portable secure storage device, to be removed from the portable secure storage device.

11. The portable secure storage device of claim 8, wherein the command from the host is a universal serial bus (USB) command requesting a transition to a U1 state.

12. The portable secure storage device of claim 8,
   wherein the inquiry from the host is a small computer system interface (SCSI) inquiry command, and
   wherein the providing to the host causes writing an indication, whether the portable secure storage device is the fixed disk or the removable disk, into a removable media bit field of a SCSI inquiry data response.

13. The portable secure storage device of claim 1, wherein the portable secure storage device comprises a second memory configured to store encrypted user data, and wherein the resetting comprises reformatting the second memory of the portable secure storage device.

14. A portable storage device that is configurable to be a removable disk or a fixed disk, comprising:
   a housing;
   a physical input device disposed on or at an outer surface of the housing;
   a physical output device disposed on or at the outer surface of the housing;
   a memory disposed within the housing; and
   one or more microprocessors disposed within the housing, wherein the one or more microprocessors are configured to cause:
      instructing the physical output device to display whether the portable storage device is the removable disk or the fixed disk;
      receiving a first input to reset the portable storage device to the fixed disk or the removable disk;
      based on the first input, resetting the portable storage device to the fixed disk or the removable disk, wherein the resetting comprises:
         resetting, by the one or more microprocessors of the portable storage device, the portable storage device to the fixed disk, when the first input is a request associated with the fixed disk; and
         resetting, by the one or more microprocessors of the portable storage device, the portable storage device to the removable disk, when the first input is a request associated with the removable disk.

15. The portable storage device of claim 14, wherein the one or more microprocessors are configured to cause the resetting the portable storage device to the fixed disk or the removable disk, while the portable storage device is not in communication with a host.

16. The portable storage device of claim 14, wherein the physical output device comprises multicolored light emitting diodes (LEDs),
   wherein the one or more microprocessors are configured to cause turning on or turning off one or more of the LEDs to indicate whether the portable storage device is the removable disk or the fixed disk,
   wherein the physical input device is an alphanumeric keypad,
   wherein the alphanumeric keypad comprises buttons,
   wherein the first input comprises a first sequence of one or more of the buttons,
   wherein prior to receiving the first input, the portable storage device is pre-configured as the removable disk; and
   wherein the portable storage device comprises: a universal serial bus (USB) plug for communicating with a host; and a second memory for storing encrypted data.

17. The portable storage device of claim 14, wherein when the portable storage device is the removable disk and when a command from a host, connected to the portable storage device, requests ejecting a medium of the portable storage device, the one or more microprocessors are configured to cause electrically disengaging the portable storage device from the host, wherein the command from the host is not a request to electrically disengage the portable storage device from the host.

18. The portable storage device of claim 14, wherein:
   while not in communication with a host, the one or more microprocessors are configured to cause: instructing the physical output device to display; receiving the first input; and resetting the portable storage device to the fixed disk or the removable disk;
   when the portable storage device is the removable disk and when the portable storage device is in communication with the host, the portable storage device allows the host to display an indication that a medium within the portable storage device is ejectable; and
   when the portable storage device is the fixed disk and when the portable storage device is in communication with the host, the portable storage device prevents the host from indicating that the medium within the portable storage device is ejectable.

19. A portable secure storage device that is configurable to be a removable disk or a fixed disk, comprising:
a housing;
means for receiving one or more input;
means for indicating one or more output;
a memory disposed within the housing;
means for causing, the means for indicating one or more output, to indicate whether the portable secure storage device is the removable disk or the fixed disk;
means for receiving a first input, via the means for receiving one or more input, to reset the portable secure storage device to the fixed disk or the removable disk; and
means for resetting, based on the first input, the portable secure storage device to the fixed disk or the removable disk, wherein the means for resetting comprises:
means for resetting the portable secure storage device to the fixed disk, when the first input is an input for the fixed disk; and
means for resetting the portable secure storage device to the removable disk, when the first input is an input for the removable disk.

20. The portable secure storage device of claim 19, wherein:
the means for resetting the portable secure storage device to the fixed disk or the removable disk comprises means for resetting the portable secure storage device to the fixed disk or the removable disk without communicating with a host;
the means for receiving the first input comprises means for receiving the first input without communicating with the host;
when the portable secure storage device is the removable disk and when the portable secure storage device is in communication with a host, the portable secure storage device allows the host to display an indication that a medium within the portable secure storage device is ejectable; and
when the portable secure storage device is the fixed disk and when the portable secure storage device is in communication with the host, the portable secure storage device prevents the host from indicating that the medium within the portable secure storage device is ejectable.

* * * * *